United States Patent
Kurushima et al.

(10) Patent No.: US 7,664,154 B2
(45) Date of Patent: Feb. 16, 2010

(54) GAS LASER OSCILLATOR AND GAS LASER BEAM MACHINE

(75) Inventors: Hiroshi Kurushima, Tokyo (JP); Hitoshi Kidokoro, Tokyo (JP); Masato Matsubara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/587,304

(22) PCT Filed: Apr. 21, 2004

(86) PCT No.: PCT/JP2004/005702

§ 371 (c)(1),
(2), (4) Date: May 7, 2007

(87) PCT Pub. No.: WO2005/104308

PCT Pub. Date: Nov. 3, 2005

(65) Prior Publication Data

US 2007/0297478 A1    Dec. 27, 2007

(51) Int. Cl.
*H01S 3/22* (2006.01)
*H01S 3/223* (2006.01)

(52) U.S. Cl. .......................................... 372/58; 372/59

(58) Field of Classification Search .............. 372/58–59
See application file for complete search history.

(56) References Cited

U.S. PATENT DOCUMENTS 3,662,279 A * 5/1972 Sandstrom et al. ............. 372/32
5,461,636 A * 10/1995 Karube et al. .................. 372/58
6,294,754 B1 * 9/2001 Nagura et al. .......... 219/121.63
7,046,705 B2 * 5/2006 Hayashikawa et al. ........ 372/35

FOREIGN PATENT DOCUMENTS

| JP | 58-144862 U | 9/1983 |
| JP | 63-227086 A | 9/1988 |
| JP | 1-106487 A | 4/1989 |
| JP | 1-128581 A | 5/1989 |
| JP | 01-291477 A | 11/1989 |
| JP | 07-142801 A | 6/1995 |
| JP | 11-87820 A | 3/1999 |
| JP | 2000-307175 A | 11/2000 |
| JP | 2003-110172 A | 4/2003 |

* cited by examiner

*Primary Examiner*—Minsun Harvey
*Assistant Examiner*—Patrick Stafford
(74) *Attorney, Agent, or Firm*—Sughrue Mion, PLLC

(57) ABSTRACT

A pressure of a laser gas in an enclosure (7) is detected by a gas pressure sensor (12), and a pressure comparison circuit (13) determines whether the thus-detected pressure is normal or anomalous. An electric current output from an inverter (10) that drives a blower (5) to cause a laser gas to flow back, is detected by a current detection circuit (9). A current comparison circuit (11) determines whether or not the output current is normal or anomalous. A result of a pressure comparison circuit (13) and a result of the current comparison circuit (11) are sent to an AND circuit (15) and performed AND processing. A result of the AND circuit (15), a result of the current detection circuit (9), and a result of the gas pressure sensor (12) are sent to a comparison operation section (17) in a controller (14). A determination is made as to whether or not the blower is anomalous. When the blower is determined to be anomalous, a signal is output to an oscillator and a machine control section (18), to thus stop the oscillator and the machine. Thereby, an anomaly in the blower (5) can be detected regardless of fluctuations in the pressure of the laser gas.

5 Claims, 8 Drawing Sheets

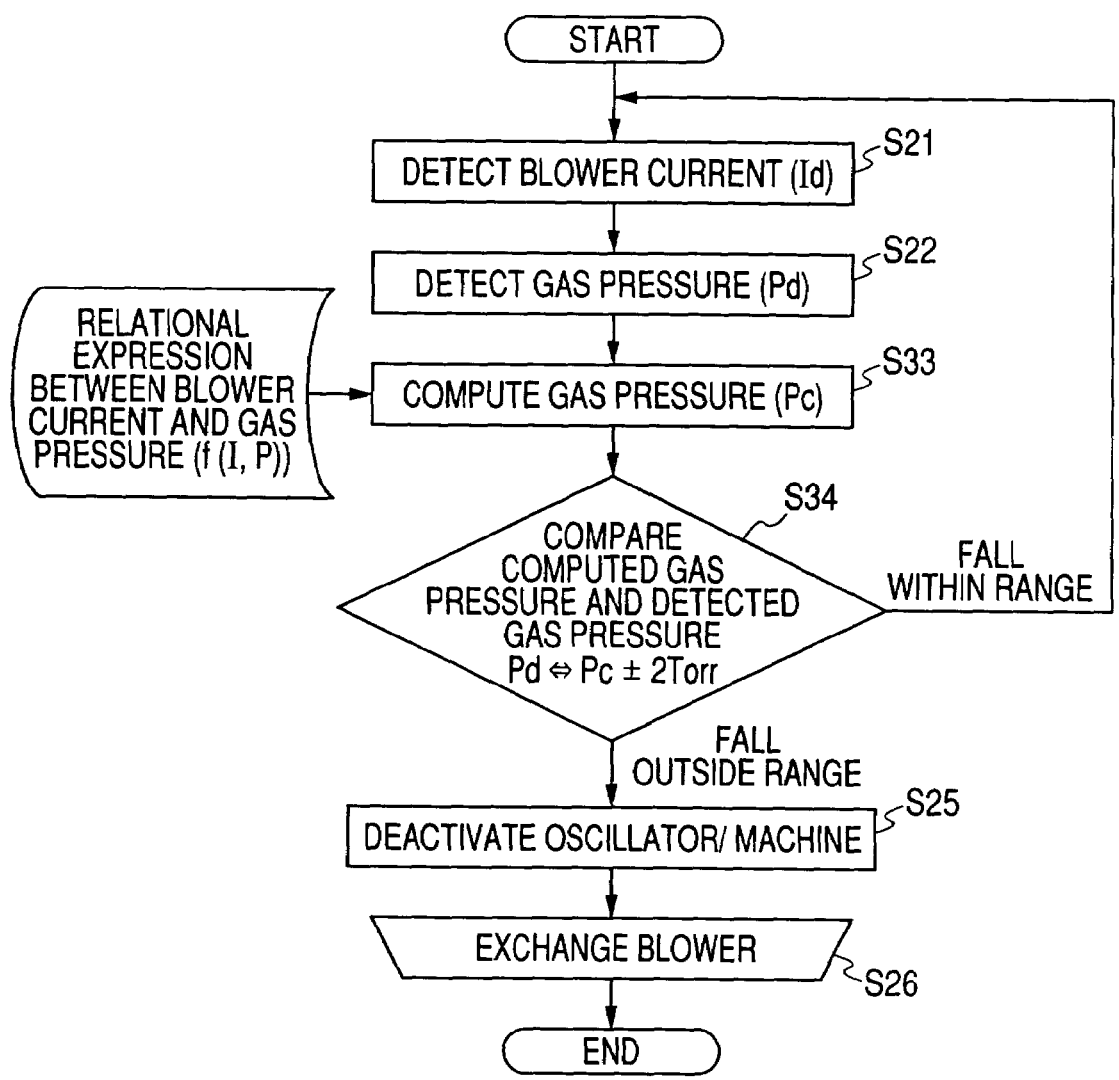

GAS LASER OSCILLATOR AND GAS LASER BEAM MACHINE

TECHNICAL FIELD

The present invention relates to a gas laser oscillator using a blower, and a gas laser beam machine equipped with the gas laser oscillator.

BACKGROUND ART

In general, a gas laser oscillator has a pair of electrodes disposed in a hermetically-sealed enclosure, and a laser gas sealed in the enclosure is forcefully circulated by a blower. The laser gas is excited by electric discharge caused by the pair of electrodes. After having been caused to resonate between a partial reflection mirror and a total reflection mirror, the thus-excited laser is radiated outside. The radiated laser is fed to a machining head through a plurality of mirrors, to thereby machine a workpiece on a machining table.

Such a blower that circulates the laser gas in the laser oscillator is handled as a kind of expendable article. When the blower stops for some reason during laser oscillation, circulation of a gas laser is interrupted, which impairs optical components or electrodes in the enclosure. Further, when the laser oscillator is used for laser machining, the stoppage of the blower results in impairment of optical components and electrodes in the laser oscillator, so that machining is continued while the quality of the laser beam remains anomalous. Thus, machining failures arise over a wide area, thereby inducing great influence. In general maintenance of a related-art blower, deterioration of a blower is determined from the estimated life of the blower predicted from operating time of the laser oscillator through periodic checks.

A method for determining an anomaly in a blower is described in JP-A-1-106487 wherein there is detected an anomaly from a relationship between an electric current of a blower coasting after stoppage of a laser oscillator and a coasting time; and a method is described in JP-A-2003-110172 for detecting an anomaly by comparing an electric current output, from an inverter section which supplies power to a blower, with a predetermined value.

Drawbacks of the related-art determination of deterioration of a blower, which is performed by estimating the life of the blower, include enforced early replacement of a blower in view of preventing maintenance and the inability to detect deterioration without periodic checks. The related-art method for detecting an anomaly described in JP-A-1-106487 can detect an anomaly only during a period of stoppage of the blower, and encounters difficulty in preventing occurrence of anomalous stoppage of the blower during the operation of the oscillator or the machine. In contrast, the related-art for detecting an anomaly in a blower described in JP-A-2003-110172 enables to prevent anomalous stoppage of a blower during machining operation. However, a current value of the blower is usually changed by the pressure of a laser gas in an enclosure as well as by deterioration of the blower. Hence, the method has a drawback of determining changes in the pressure of a laser gas as deterioration of the blower.

DISCLOSURE OF THE INVENTION

The present invention has been made to solve the problems and aims at providing a gas laser oscillator having a device capable of detecting deterioration of a blower during operation of the oscillator or a machine regardless of changes in the pressure of a laser gas, and providing a gas laser beam machine.

According to the present invention, a gas laser oscillator and a gas laser beam machine includes current detection means for detecting an electric current output from an inverter which feeds drive power to the blower; and pressure detection means for detecting the pressure of the laser gas in the enclosure, wherein an anomaly in the blower is detected by utilizing the electric current output from the inverter detected by the current detection means, the pressure of the laser gas detected by the pressure detection means and a relational expression between the electric current and the pressure of the laser gas, which is stored separately.

According to the above configuration, the present invention enables to detect the deterioration of a blower during operation of the oscillator or the machine regardless of changes in the pressure of the laser gas. As a result, the laser oscillator can prevent anomalous stoppage of the blower during oscillation of the laser, thereby yielding an advantage of the ability to significantly reduce impairment of optical components and electrodes in the enclosure, which would otherwise be caused by anomalous stoppage of the blower. Further, the gas laser beam machine yields an advantage of the ability to prevent anomalous stoppage of the blower during laser machining operation and to confine a machining failure, which would otherwise arise over a wide range as a result of anomalous stoppage of a related-art blower, solely to a range where the machine has stopped.

BRIEF DESCRIPTION OF THE DRAWINGS

FIG. 9 is a flowchart showing operation of the laser oscillator according to a fourth embodiment of the present invention.

BEST MODES FOR CARRYING OUT THE INVENTION

First Embodiment

Figure 1:
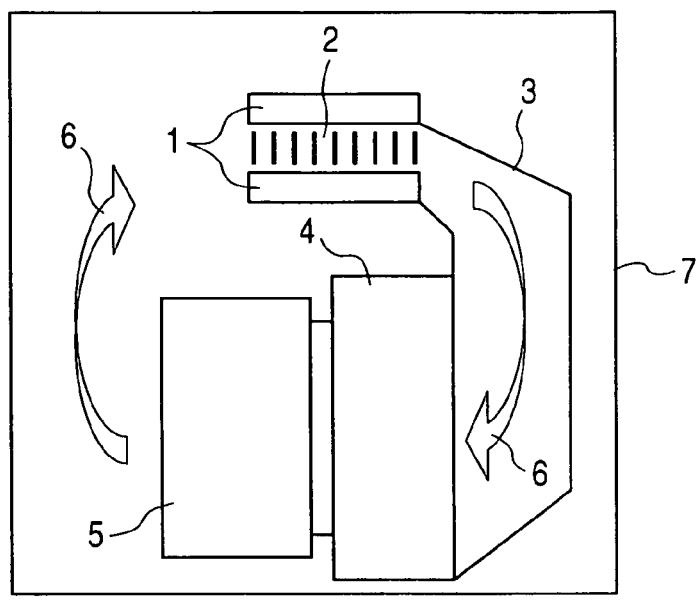
FIG. 1 is a side view of a laser oscillator according to a first embodiment of the present invention.
Figure 2:
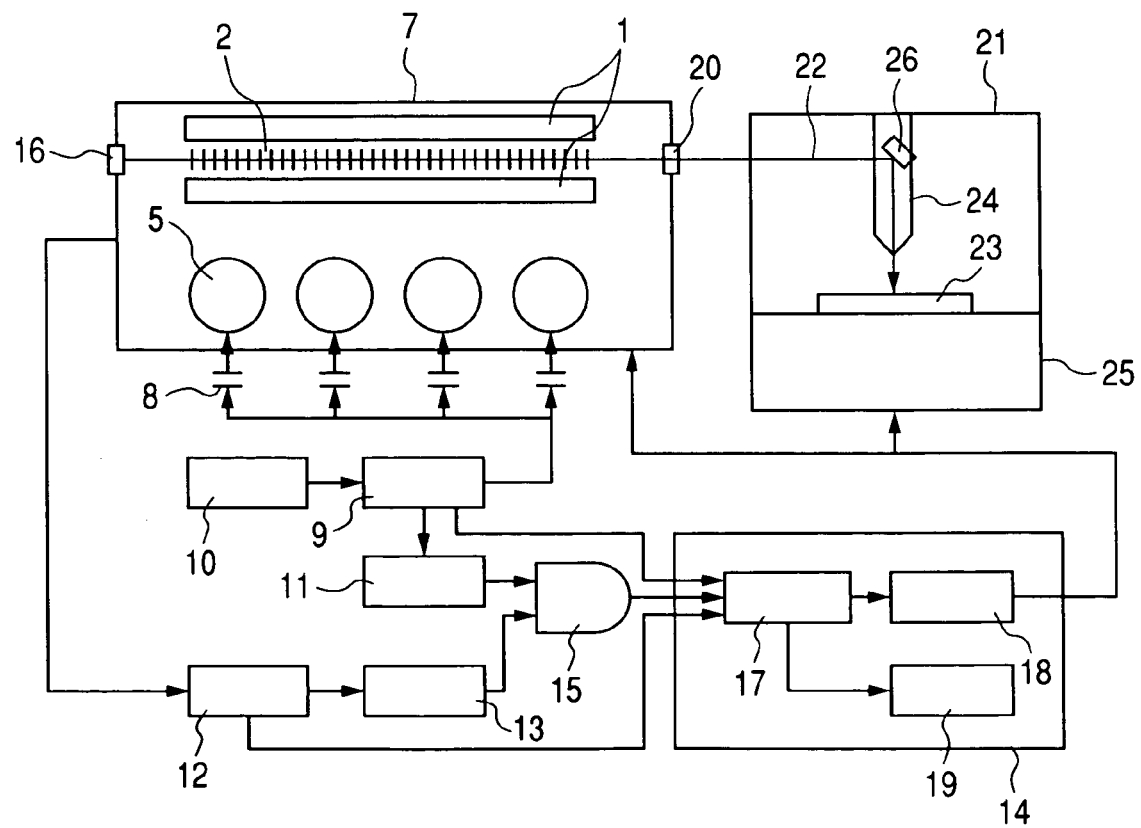
FIG. 2 is a front view of the laser oscillator according to the first embodiment and a block diagram for detecting deterioration of a blower.

FIG. 1 is a schematic diagram showing a lateral cross section of a laser oscillator according to a first embodiment used for implementing the present invention, and FIG. 2 is a longitudinal cross section of the laser oscillator and a general view of a laser beam machine showing a device for detecting an anomaly in a blower and a main body of the machine.

In FIGS. 1 and 2, a laser gas, such as $CO_2$, $N_2$, He, or the like, is sealed in an enclosure 7. The laser gas is forcefully circulated in a direction of arrow 6 by a plurality of blowers 5 disposed in the enclosure 7. The laser gas having become hot after having passed through a discharge space 2 between a pair of electrodes 1 flows through a gas duct 3 and is cooled by a heat exchanger 4. The thus-cooled laser gas is again caused to flow back between the electrodes 1 by the plurality of blowers 5. The circulated laser gas is excited by the electric discharge induced by the pair of electrodes 1, and the thus-excited laser is caused to resonate between a partial reflection mirror 20 and a total reflection mirror 16, and is radiated outside. The thus-radiated laser is fed to a machining head 24 in the machine main body 21 through a plurality of mirrors 26, and is radiated on a workpiece 23 on a machining table 25 to machine the workpiece 23. The operation of the laser oscillator and that of the laser beam machine are controlled by an oscillator and a machine control section 18, which are disposed in a controller 14.

The pressure of the laser gas sealed in the enclosure 7 varies according to the model of the laser oscillator. A preset value is usually set so as to range from about 50 Torr to about 200 Torr, and an offset from the preset value is maintained so as to fall within a range of ±2 Torr or thereabouts. At the time of replacement of the laser gas, the internal pressure of the enclosure 7 is dropped to 0.1 Torr or thereabouts. The pressure of the laser gas in the enclosure 7 is monitored by a gas pressure sensor 12 which is laser gas pressure detection means. A pressure comparison circuit 13, which serves as laser gas pressure comparison means, compares an output of the gas pressure sensor 12 with a normal laser gas pressure, to thus determine whether the pressure of the laser gas is normal or anomalous.

Meanwhile, a drive section of the blower 5 includes an inverter 10 for feeding power; a current detection circuit 9 serving as means for detecting an electric current of the blower; and a thermal relay 8. In the event that a heavy current has flowed into the blower 5 for reasons of burning or the like, the thermal relay 8 operates to deactivate the laser oscillator. Moreover, the current detection circuit 9 detects an electric current output from the inverter 10. A current comparison circuit 11 serving as blower current comparison means compares the detected output current with a normal current, to thus determine whether the current is normal or anomalous.

As mentioned previously, the blower 5 rotates at high speed in a vacuum of the order of 50 to 200 Torr or thereabouts. Accordingly, there is adopted a method for lessening friction by applying vacuum grease of high vapor pressure to a bearing mechanism. However, despite employment of this method, the friction often arises in the bearing mechanism. When the friction has arisen in the bearing mechanism, the electric current required to rotate the blower is increased.

Figure 3:
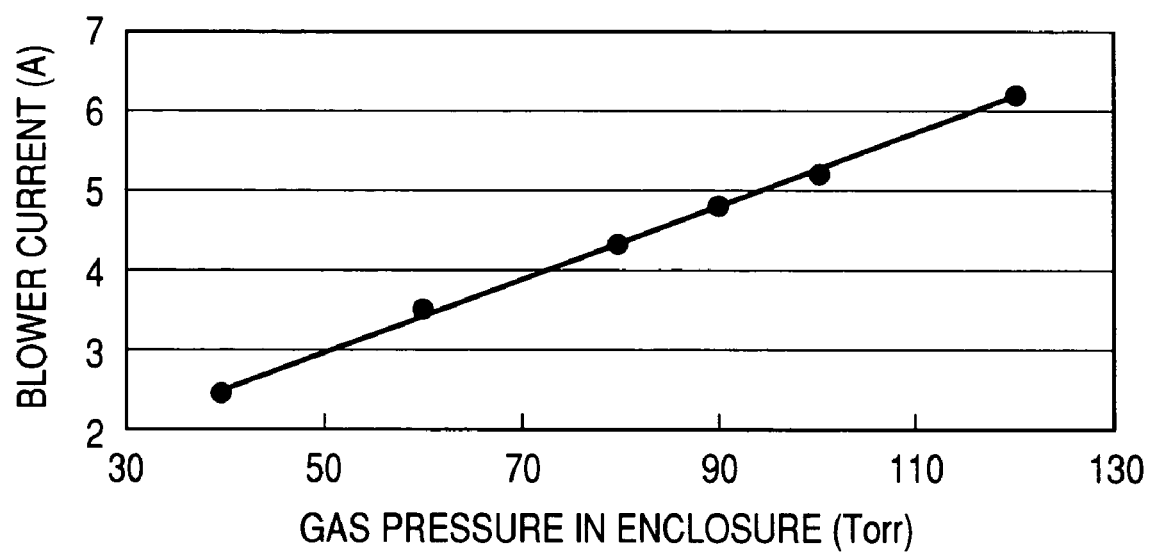
FIG. 3 is an exemplary graph showing a relationship between a pressure of a laser gas and the electric current of the blower.

As mentioned previously, variations in the pressure of the laser gas are also responsible for fluctuations in the electric current of the blower. A relationship between the electric current of the blower and the pressure of the laser gas is shown in FIG. 3. FIG. 3 shows values achieved in the laser oscillator used by the inventors for examining the present invention. According to a general relationship, the greater the pressure of the laser gas becomes, the higher the electric current of the blower becomes, and conversely, the lower the pressure of the laser gas, the lower the electric current of the blower.

The following configuration is adopted in order to determine that variations in the electric current of the blower are caused by an anomaly in the blower. A result output from the pressure comparison circuit 13 and a result output from the current comparison circuit 11 are sent to an AND circuit 15, and are subjected to AND processing. A result produced by the AND circuit 15, an output from the current detection circuit 9, and an output from the gas pressure sensor 12 are sent to a comparison operation section 17 in the controller 14. The comparison operation section 17 determines whether the blower is anomalous. When the comparison operation section 17 has determined that the blower is anomalous, a signal is output to the oscillator and the machine control section 18, thereby deactivating the oscillator and the machine and outputting a signal to an alarm 19 to thus inform an operator of the anomaly.

Next, operation of the laser oscillator and operation of the laser beam machine, both of which pertain to the first embodiment, will be described with reference to FIG. 3 and a flow-chart of FIG. 4. A preset gas pressure 55±2 Torr of the laser oscillator examined by the inventors in the present invention, a relationship between the pressure of the laser gas and the current of the blower shown in FIG. 3, and a preset blower current of 3.1±0.1 A with respect to the preset gas pressure determined from FIG. 3 are taken as examples. Obviously, a relational expression between a preset gas pressure and a preset blower current and a relational expression between the pressure of a laser gas and the current of a blower are determined, as required, according to an oscillator to which the relational expressions are applied, and are not limited specifically to the above values.

First, the current detection circuit 9 detects a blower current Id, and outputs the thus-detected value to the blower current comparison circuit 11 and the comparison operation section 17 (step S01).

Next, the gas pressure sensor 12 detects a laser gas pressure Pd in the enclosure 7, and outputs the thus-detected value to the pressure comparison circuit 13 and the comparison operation section 17 (step S02).

The current comparison circuit 11 compares a preset blower current Is (3.1±0.1 A) stored in the current comparison circuit 11 with the blower current Id. When the current Id falls within a range of 3.1±0.1 A, a High signal (hereinafter simply abbreviated as "H") is output. In contrast, when the current Id is out of the range of 3.1±0.1 A, a Low signal (hereinafter "L") is output to the AND circuit 15 (step S03).

The pressure comparison circuit 13 compares the preset gas pressure Ps (55±2 Torr) stored in the pressure comparison circuit 13 with the laser gas pressure Pd. When the gas pressure Pd falls within a range of 55±2 Torr, a High signal (hereinafter "H") is output. In contrast, when the gas pressure Pd is out of a range of 55±2 Torr, a Low signal (hereinafter "L") is output (step S04).

The AND circuit 15 performs AND processing to an output from the current comparison circuit 11 and an output from the pressure comparison circuit 13, and outputs a result of the processing to the comparison operation section 17 (step S05).

When the result of AND processing is High (hereinafter "H") in step S05, the blower 5 is determined to be normal, and monitoring of an anomaly in the blower is again continued from step S01. When the result of AND processing is Low (hereinafter "L") in step S05, the possibility of occurrence of an anomaly in the blower is considered. Hence, processing provided below is performed.

The comparison operation section 17 computes a blower current Ic ideal for the gas pressure Pd detected in step S02 through use of the relationship (FIG. 3) between the blower current stored in the comparison operation section 17 and the pressure of the gas laser (step S06).

When the blower current Id detected in step S01 falls within a range of Ic±0.1 A, the comparison operation section 17 determines the blower 5 to be normal, and again continues monitoring of an anomaly in the blower from step S01. In contrast, when the blower current Id detected in step S01 does not fall within a range of Ic±0.1 A, the comparison operation section 17 determines the blower 5 to be anomalous; and outputs a stop signal to the oscillator and the machine control section 18 as well as to the alarm 19 (step S07).

The oscillator and the machine control section 18 stop the oscillator and the machine, and the alarm 19 issues an alarm to the operator (step S08).

The operator having received the alarm replaces the blower 5 (step S09).

The first embodiment is provided with the above configuration, and implements the operations set above. As result, there is configured a laser oscillator capable of eliminating the gas pressure as a factor responsible for the fluctuations in the current of the blower, by utilizing an electric current output from the inverter which drives the blower and an output from the gas pressure sensor; and detecting an anomaly in the blower without fail. Thus, there is yielded an advantage of the ability to significantly diminish the chance of impairment of optical components and electrodes in the enclosure, which would otherwise be caused when the blower stops during laser oscillation. The laser beam machine using the oscillator yields an advantage of the ability to minimize machining failures.

The inverter is usually provided with a current detection function, and issues an alarm when a blower current has dropped lower than a constant value. Meanwhile, the blower current detection circuit detects a current output from the inverter, and issues an alarm when the current is not suitable for the gas pressure. As mentioned above, interlock is doubly effected by detecting the current of the blower at two points.

Moreover a blower current detection circuit does not need to be provided for each of the blowers. So long as a preset value appropriate to the number of blowers is set, a single current detection circuit is sufficient.

Second Embodiment

Figure 5:
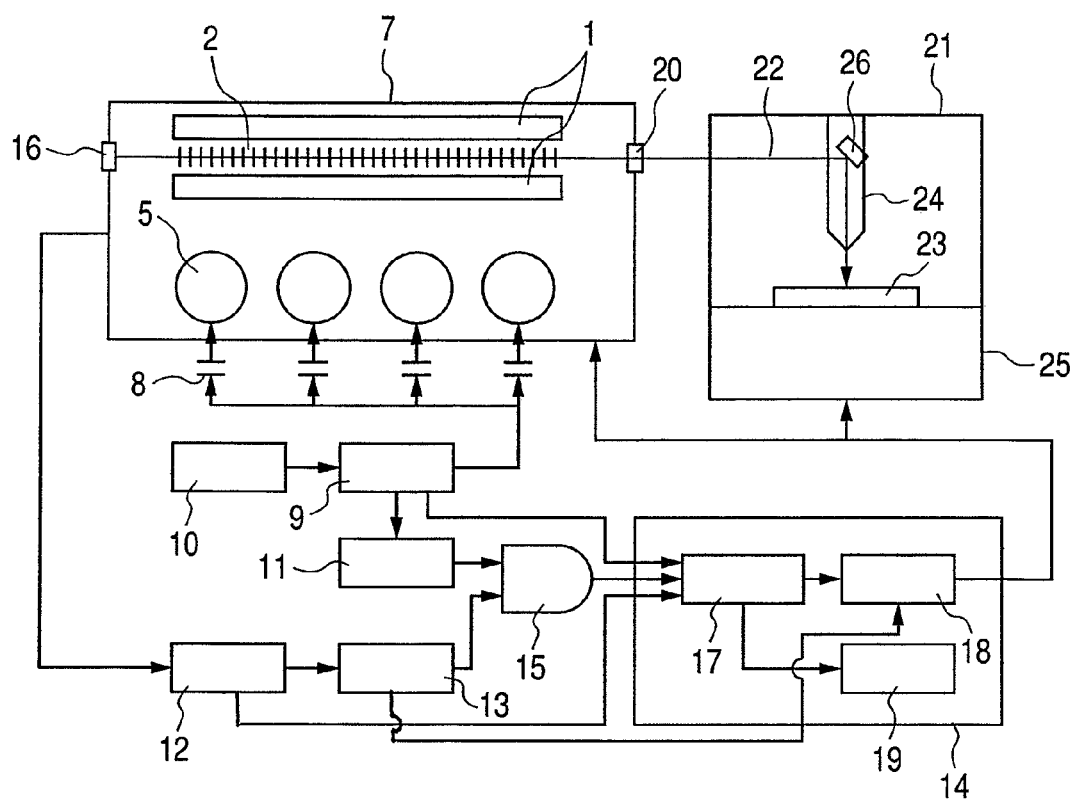
FIG. 5 is a front view showing a laser oscillator according to a second embodiment and a block diagram for detecting deterioration of a blower.
Figure 6:
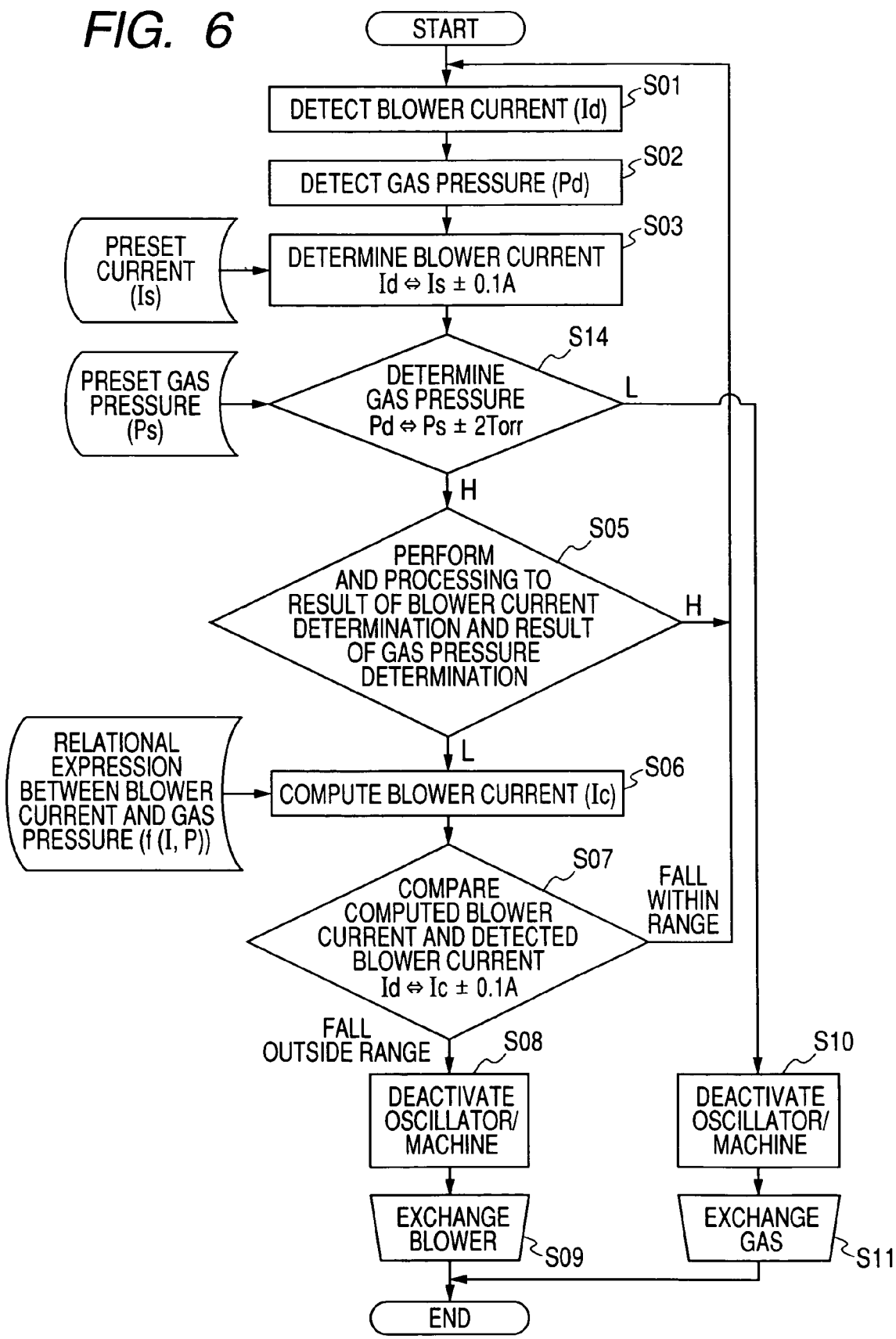
FIG. 6 is a flowchart showing operation of the laser oscillator according to the second embodiment of the present invention.

In the first embodiment, detection of an anomaly in the pressure of the laser gas and detection of an anomaly in the blower are performed separately, but they may be performed during a same operation. In contrast with the configuration of FIG. 2, which is the block diagram of the first embodiment, the laser oscillator of the present embodiment is characterized, as shown in FIG. 5, in that there is provided a path by which a stop signal is output from the pressure comparison circuit 13 to the oscillator and the machine control section 18. Operation of the laser oscillator is described with reference to a flowchart of FIG. 6.

Figure 4:
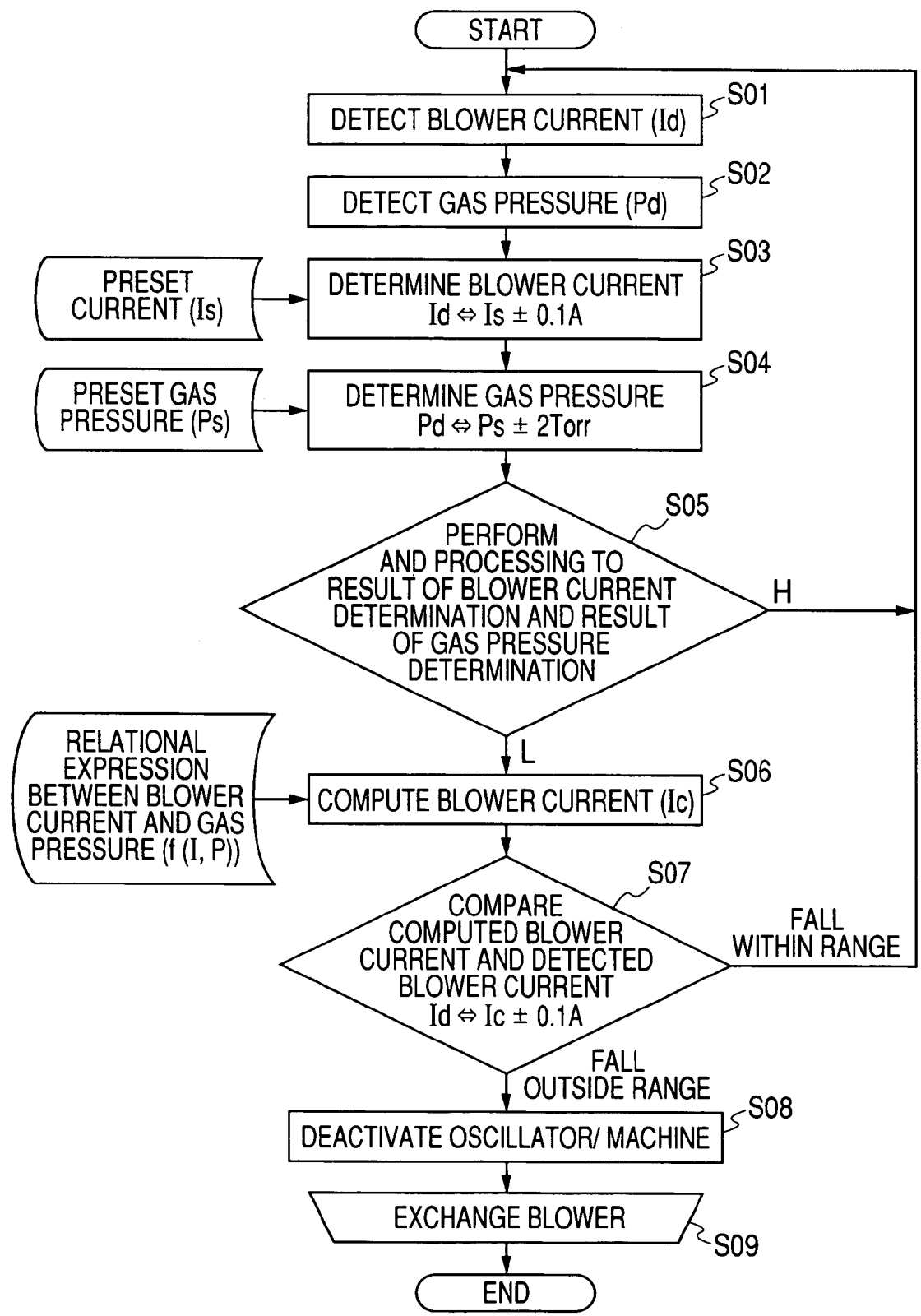
FIG. 4 is a flowchart showing operation of the laser oscillator according to the first embodiment of the present invention.

The flowchart is basically almost identical with the flow of the flowchart shown in FIG. 4. A difference between the flowcharts lies in that step S04 is replaced with new step S14 and that steps S10 and S11 are newly added. Processing pertaining to steps S14, S10, and S11 are described below.

After comparing the blower currents in step S03, the pressure comparison circuit 13 compares the preset gas pressure Ps stored in the pressure comparison circuit 13 (55±2 Torr) with the laser gas pressure Pd. If the gas pressure Pd falls within a range of 55±2 Torr, a High signal (hereinafter "H") is output. In contrast, when the gas pressure Pd falls outside a range of 55±2 Torr, the gas pressure is determined to be anomalous, and a stop signal is output to the oscillator and the machine control section 18, and to the alarm 19 (step S14).

The oscillator and the machine control section 18 stop the oscillator and the machine, and the alarm 19 issues an alarm to the operator (step S10).

The operator having received an alarm exchanges a laser gas (step S11).

The second embodiment is provided with the above configuration, and implements the operations set above. As a result, there can be yielded the same advantage as that yielded by the first embodiment. Further, there is yielded an advantage of the ability to detect an anomaly in the gas pressure during the course of detection of an anomaly in the blower; to immediately stop the oscillator and the machine even in the case of an anomaly in the gas pressure; to significantly diminish impairment of optical components and electrodes in the enclosure of the oscillator; and to minimize machining failures so long as laser operation is in operation.

Third Embodiment

Figure 7:
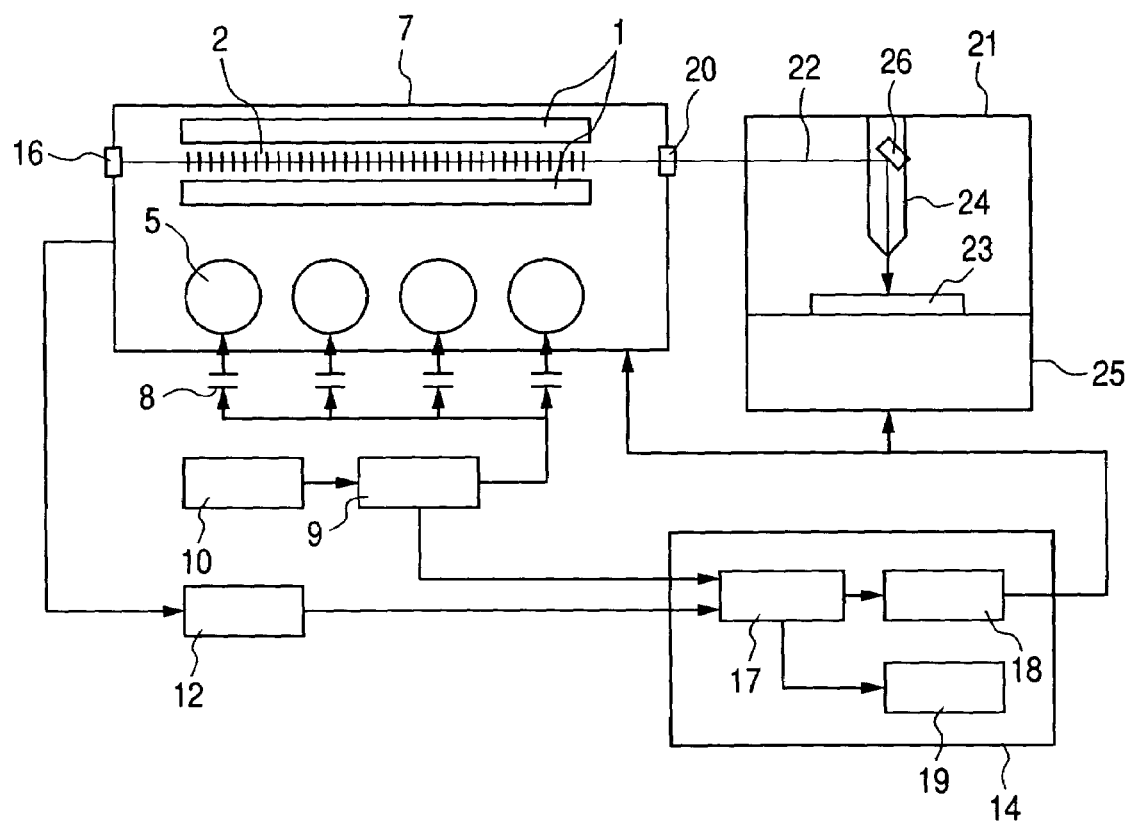
FIG. 7 is a front view of a laser oscillator showing third and fourth embodiments and a block diagram for detecting deterioration of a blower.

FIG. 7 is a longitudinal cross section of a laser oscillator according to a third embodiment for implementing the present invention and a general view of the laser beam machine showing a device for detecting an anomaly in the blower and the main body of the machine.

As shown in FIG. 7, in contrast with the first embodiment, the third embodiment has a configuration of deleting the current comparison circuit 11, the pressure comparison circuit 13, and the AND circuit 15; feeding a value detected by the current detection circuit 9 and a value detected by the gas pressure sensor 12 to the comparison operation section 17; and determining an anomaly in the blower.

Next, the operation of the laser oscillator and that of the laser beam machine, both of which pertain to the third embodiment, will be described with reference to FIG. 7 and a flowchart of FIG. 8. As in the case of the first embodiment, a preset gas pressure 55±2 Torr of the laser oscillator examined by the inventors in the present invention, a relationship between the pressure of the laser gas and the current of the blower shown in FIG. 3, and a preset blower current of 3.1±0.1 A with respect to the preset gas pressure determined from FIG. 3 are taken as examples. Obviously, the preset gas pressure, a relational expression between the pressure of a laser gas and the current of a blower, or a preset blower current are determined as required according to an oscillator to which the relational expressions are applied, and are not limited specifically to the above values.

First, the current detection circuit 9 detects a blower current Id, and outputs the thus-detected value to the comparison operation section 17 (step S21).

Next, the gas pressure sensor 12 detects a laser gas pressure Pd in the enclosure 7, and outputs the thus-detected value to the comparison operation section 17 (step S22).

The comparison operation section 17 computes a blower current Ic ideal for the gas pressure Pd detected in step S02 through use of the relationship (FIG. 3) between the blower current stored in the comparison operation section 17 and the pressure of the gas laser (step S23).

When the blower current Id detected in step S21 falls within a range of Ic±0.1 A, the comparison operation section 17 determines the blower 5 to be normal, and again continues monitoring of an anomaly in the blower from step S21. In contrast, when the blower current Id does not fall within a range of Ic±0.1 A, the comparison operation section 17 determines the blower 5 to be anomalous; and outputs a stop signal to the oscillator and the machine control section 18 and to the alarm 19 (step S24).

The oscillator and the machine control section 18 stop the oscillator and the machine, and the alarm 19 issues an alarm to the operator (step S25).

The operator having received the alarm replaces the blower 5 (step S26).

The third embodiment is provided with the above configuration, and implements the operations set above. As a result, there can be yielded the same advantage as that yielded by the first embodiment. Further, there is yielded an advantage of a circuit configuration being made simpler than in the first embodiment.

Fourth Embodiment

In the third embodiment, the detected blower current Id is compared with the computed blower current Ic, to thus detect an anomaly in the blower. The detected gas pressure Pd may be compared with the computed gas pressure Pc, to thus detect an anomaly in the blower. The configuration of the laser oscillator is identical with that of the laser oscillator shown in FIG. 7. Operation of the laser oscillator is described with reference to the flowchart of FIG. 9.

Figure 8:
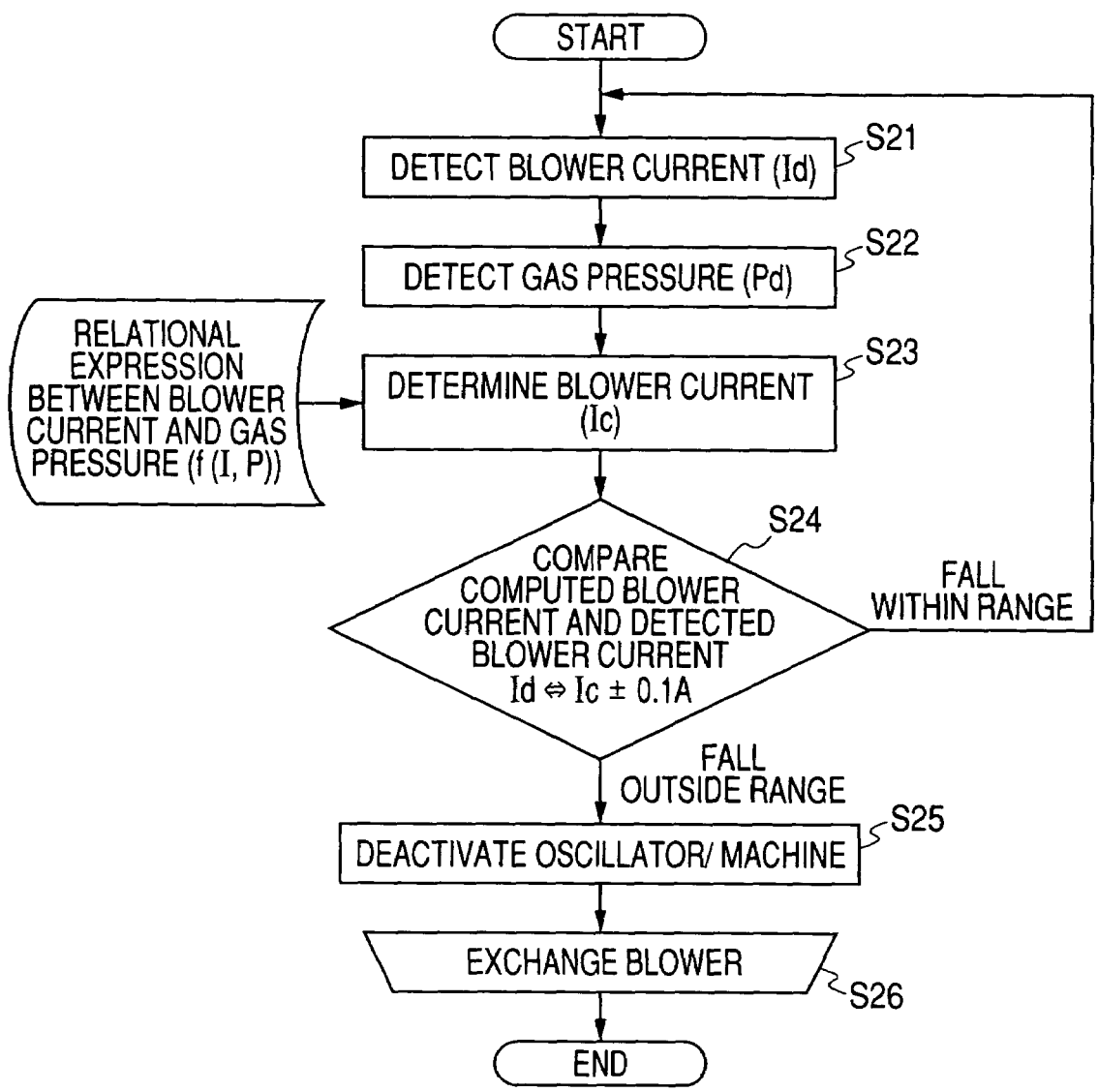
FIG. 8 is a flowchart showing operation of the laser oscillator according to a third embodiment of the present invention.

The flowchart is basically, almost identical with the flow of the flowchart shown in FIG. 8. A difference between the flowcharts lies in that steps S23 and S24 are replaced with new steps S33 and S34. Steps 33, 34 will be described hereinbelow.

The comparison operation section 17 computes a gas pressure Pc ideal for the blower current Id detected in step S21 through use of the relationship (FIG. 3) between the blower current stored in the comparison operation section 17 and the pressure of the gas laser (step S33).

When the gas pressure Pd detected in step S22 falls within a range of Pc±2 Torr, the comparison operation section 17 determines the blower 5 to be normal, and again continues monitoring of an anomaly in the blower from step S21. In contrast, when the gas pressure Pd does not fall within a range of Pc±2 Torr, the comparison operation section 17 determines the blower 5 to be anomalous; and outputs a stop signal to the oscillator and the machine control section 18 and to the alarm 19 (step S34).

The fourth embodiment is provided with the above configuration, and implements the operations set above. As a result, there can be yielded the same advantage as that yielded by the first embodiment. Further, there is yielded an advantage of a circuit configuration being made simpler than in the first embodiment.

INDUSTRIAL APPLICABILITY

As mentioned above, the gas laser oscillator and the gas laser beam machine according to the present invention are suitable for use as a gas laser oscillator and a gas laser beam machine that oscillates and machines even when a blower runs continuously over a long period of time.

The invention claimed is:

1. A gas laser oscillator comprising:
   a sealed enclosure;
   a laser gas sealed in the enclosure;
   a pair of electrodes that generate electric discharge in the laser gas;
   a blower that causes the laser gas to flow between the electrodes;
   a current detection section that detects an electric current output from an inverter that provides drive power to the blower; and
   a pressure detection section that detects a pressure of the laser gas in the enclosure,
   wherein an anomaly of the blower is detected by utilizing the electric current output from the inverter detected by the current detection section, the pressure of the laser gas detected by the pressure detection section, and a relational expression between the electric current and the pressure of the laser gas, the relational expression being stored separately.

2. The gas laser oscillator according to claim 1, further comprising a controller that: computes an ideal output current from the pressure of the laser gas, detected by the pressure detection section, and the relational expression; compares the ideal output current with an actual output current detected by the current detection section; and controls the gas laser oscillator to stop when the blower is determined to be anomalous.

3. The gas laser oscillator according to claim 2, further comprising:
   a current comparison section that compares the electric current output from the inverter with a preset output voltage;
   a pressure comparison section that compares the pressure of the laser gas, detected by the pressure detection section, with a preset gas pressure; and
   an AND circuit that performs AND processing to a result from the current comparison section and a result from the pressure comparison section,
   wherein, when it is determined in the AND circuit that any one of the result from the current comparison section and the result from the pressure comparison section deviates from the corresponding preset value, the controller determines the blower is anomalous.

4. The gas laser oscillator according to claim 1, further comprising a controller that computes an ideal laser gas pressure from the electric current output from the inverter detected by the current detection section, the pressure of the laser gas, detected by the pressure detection section, and the relational expression; compares the ideal laser gas pressure with an actual pressure of the laser gas detected by the pressure detection section; and controls the gas laser oscillator to stop when the blower is determined to be anomalous.

5. A gas laser beam machine that performs machining by utilizing a gas laser oscillator, the gas laser oscillator comprising:
   a sealed enclosure;
   a laser gas sealed in the enclosure;
   a pair of electrodes that generates electric discharge in the laser gas;
   a blower that causes the laser gas to flow between the electrodes;
   a current detection system section that detects an electric current output from an inverter that provides drive power to the blower; and
   a pressure detection section that detects a pressure of the laser gas in the enclosure,
   wherein an anomaly of the blower is detected by utilizing the electric current output from the inverter detected by the current detection section, the pressure of the laser gas detected by the pressure detection section, and a relational expression between the electric current and the pressure of the laser gas, the relational expression being stored separately, and
   wherein a laser beam generated by said oscillator is fed to a machining head of said gas laser beam machine.

* * * * *